(12) United States Patent
Paratore

(10) Patent No.: US 8,384,696 B2
(45) Date of Patent: Feb. 26, 2013

(54) CARRIER FOR A DIGITAL PEN

(75) Inventor: Robert M. Paratore, Redmond, WA (US)

(73) Assignee: Adapx, Inc., Seattle, WA (US)

( * ) Notice: Subject to any disclaimer, the term of this patent is extended or adjusted under 35 U.S.C. 154(b) by 570 days.

(21) Appl. No.: 12/553,698

(22) Filed: Sep. 3, 2009

(65) Prior Publication Data

US 2010/0232116 A1 Sep. 16, 2010

Related U.S. Application Data

(63) Continuation of application No. 11/950,951, filed on Dec. 5, 2007, now abandoned, and a continuation-in-part of application No. 11/751,544, filed on May 21, 2007, now Pat. No. 7,884,811.

(60) Provisional application No. 60/868,717, filed on Dec. 5, 2006.

(51) Int. Cl.
*G06F 3/033* (2006.01)

(52) U.S. Cl. ............. 345/179; 345/180; 178/19.05

(58) Field of Classification Search ............. 345/156, 345/179
See application file for complete search history.

(56) References Cited

U.S. PATENT DOCUMENTS

| | | | |
|---|---|---|---|
| 2,168,918 A * | 8/1939 | Spitalny | 206/251 |
| 4,131,880 A | 12/1978 | Siy et al. | |
| 5,410,334 A | 4/1995 | Comerford | |
| 5,652,412 A | 7/1997 | Lazzouni et al. | |
| 5,661,506 A | 8/1997 | Lazzouni et al. | |
| 6,056,118 A * | 5/2000 | Hargus et al. | 206/438 |
| 6,084,577 A | 7/2000 | Sato et al. | |
| 6,104,388 A | 8/2000 | Nagai et al. | |
| 6,130,666 A | 10/2000 | Persidsky | |
| 6,188,392 B1 | 2/2001 | O'Connor et al. | |
| 6,310,988 B1 | 10/2001 | Flores et al. | |
| 6,344,848 B1 | 2/2002 | Rowe et al. | |
| 6,422,775 B1 | 7/2002 | Bramlett et al. | |
| 6,503,085 B1 | 1/2003 | Elkind | |
| 6,573,887 B1 | 6/2003 | O'Donnell, Jr. | |
| 6,592,039 B1 | 7/2003 | Smith et al. | |
| 6,627,870 B1 | 9/2003 | Lapstun et al. | |
| 6,650,320 B1 | 11/2003 | Zimmerman | |
| 6,686,910 B2 | 2/2004 | O'Donnell, Jr. | |
| 6,806,868 B2 | 10/2004 | Chuang | |
| 6,832,116 B1 | 12/2004 | Tillgren et al. | |
| 6,985,138 B2 | 1/2006 | Charlier | |
| 7,010,147 B2 | 3/2006 | Silverbrook et al. | |
| 7,013,029 B2 | 3/2006 | Keskar et al. | |
| 7,015,901 B2 | 3/2006 | Lapstun et al. | |
| 7,126,590 B2 | 10/2006 | Jelinek et al. | |
| 7,167,164 B2 | 1/2007 | Ericson et al. | |

(Continued)

FOREIGN PATENT DOCUMENTS

WO 2008070724 6/2008
WO 2009149110 12/2009

*Primary Examiner* — Duc Dinh
(74) *Attorney, Agent, or Firm* — Richard C. Vershave; Foster Pepper PLLC

(57) ABSTRACT

A carrier for a digital pen includes a main case with an internal channel to closely receive and align the digital pen with an electronic package contained within the main case. In addition, the carrier includes an upper lid rotationally coupled to the main case. In one embodiment, the upper lid may be both partially and fully opened with a dual-action latch mechanism. In addition, the carrier may include a lower lid that may be opened to provide access to an electronic package. In one embodiment, an extendable serial communication device may be extended from the electronic package when the lower lid is open. Further, the carrier is configured to sufficiently protect the digital pen from harsh environmental conditions and even from harsh user-induced conditions, such as drops onto a hard surface, exposure of the carrier to rain, dust, and sand particulate, brief water submersion, and even temperature extremes.

7 Claims, 8 Drawing Sheets

U.S. PATENT DOCUMENTS

| | | |
|---|---|---|
| 7,176,906 B2 | 2/2007 | Williams et al. |
| 7,203,384 B2 | 4/2007 | Carl |
| 7,231,181 B2 | 6/2007 | Kohli et al. |
| 7,239,306 B2 | 7/2007 | Fahraeus et al. |
| 7,342,575 B1 | 3/2008 | Hartwell et al. |
| 2003/0112623 A1 | 6/2003 | Yu et al. |
| 2004/0217021 A1* | 11/2004 | Chao .................................. 206/5 |
| 2005/0030297 A1 | 2/2005 | Burstrom et al. |
| 2006/0028458 A1* | 2/2006 | King et al. .................... 345/179 |
| 2006/0109262 A1 | 5/2006 | Yeh |
| 2006/0189903 A1 | 8/2006 | Poreh et al. |
| 2007/0160971 A1 | 7/2007 | Caldera et al. |
| 2007/0299360 A1 | 12/2007 | Snyder et al. |
| 2008/0186255 A1* | 8/2008 | Cohen et al. ....................... 345/8 |

* cited by examiner

CARRIER FOR A DIGITAL PEN

PRIORITY CLAIM

This application is a continuation of U.S. patent application Ser. No. 11/950,951 filed Dec. 5, 2007 which is a continuation-in-part of U.S. patent application Ser. No. 11/751,544 filed on May 21, 2007, which claims priority to U.S. Provisional Patent Application No. 60/868,717 filed on Dec. 5, 2006, contents of which are incorporated herein by reference.

FIELD OF THE INVENTION

This invention relates generally to a carrier or carrying case for a digital pen, and more specifically to a rugged and durable carrier or carrying case for a digital pen.

BACKGROUND OF THE INVENTION

Conventional digital pens include a number of fragile and expensive components. As the use of conventional digital pens has become more common, they have been utilized in different and often harsh environments. Various types of conventional digital pens include, but are not limited to, the MAXELL® digital pen, the NOKIA® digital pen, the LEAPFROG FLYFUSION® digital pen and the LOGITECH® digital pen.

One drawback of the conventional digital pen is they are primarily designed for the office and business environments and generally lack the ruggedness and toughness to be transported through or into various harsh environments, such as a military battlefield, a construction zone, outdoor recreation, plant or factory lines, or other types of harsh environments. Although the conventional digital pen may function sufficiently well in the harsh environment, it is often the case that the conventional digital pen becomes damaged while it is in transit, whether it be attached to a user of the pen or placed in a backpack, for example. The harshness of a particular environment may be such that it may cause structural damage to the conventional pen, cause thermal damage, or may cause some other type of damage that would render the conventional digital pen less than fully functional.

SUMMARY OF THE INVENTION

The present invention relates to a carrier, carrying case, package or similar device for holding and/or transporting a digital pen to sufficiently protect it from harsh environmental conditions and even from harsh user-induced conditions. One aspect of the invention is to provide a rugged digital pen carrier operable to transport the digital pen through and within multiple harsh environments while enabling the digital pen and electronics within the carrier to remain fully functional in the event it drops onto a hard surface, exposure of the carrier to rain, dust, and sand particulates, brief water submersion, and even temperature extremes.

In accordance with an aspect of the invention, a carrier for a digital pen includes a main case for receiving the digital pen, the main case having a lower body portion with an internal channel for receiving the digital pen, the internal channel contoured to frictionally engage and substantially restrain the digital pen after insertion of the digital pen into the carrier; an upper lid rotationally and biasly coupled to the main case about a pivot axis, the upper lid having a contoured engagement surface configured to engage a complementary engagement surface of the main case; and an electronic package having a plurality of electrical contacts for engaging complementary electrical contacts on the digital pen, the electronic package proximate the internal channel of the main case.

In accordance with another aspect of the invention, a carrier for a digital pen includes a main case for receiving the digital pen; an upper lid rotationally and biasly coupled to the main case about a pivot axle, the upper lid having a contoured engagement surface configured to engage a complementary engagement surface of the main case; and a latch mechanism having a lifting portion rotationally coupled to a latching portion, the latching portion rotationally coupled to the upper lid, the lifting portion operable to allow the upper lid to partially rotate away from the main case, the latching portion releasable from the first main case to allow the upper lid to fully rotate away from the main case.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention comprises a rugged and durable carrier, carrying case, package or similarly named device for receiving and holding a digital pen. The structural arrangement of the carrier advantageously provides protection for the digital pen inserted within and preferably protects the digital pen during transportation within and through harsh environmental conditions and during harsh user-induced conditions. By way of example, the carrier protects the digital pen and the delicate electronics and/or opto-electronics within the digital pen even if the carrier happens to be dropped onto a hard surface, exposed to rain, dust, or sand particulate, submersed in water or possibly other types of fluids, and exposed to temperature extremes. In one embodiment, the carrier includes upper and lower lids or caps that may be fail-safe latched to a main body of the carrier. In short, the carrier provides operational and non-operational protections from harsh environments for the digital pen and may also provide a power interface and a communication interface between the digital pen and other media via wireless or non-wireless means.

Figure 1:
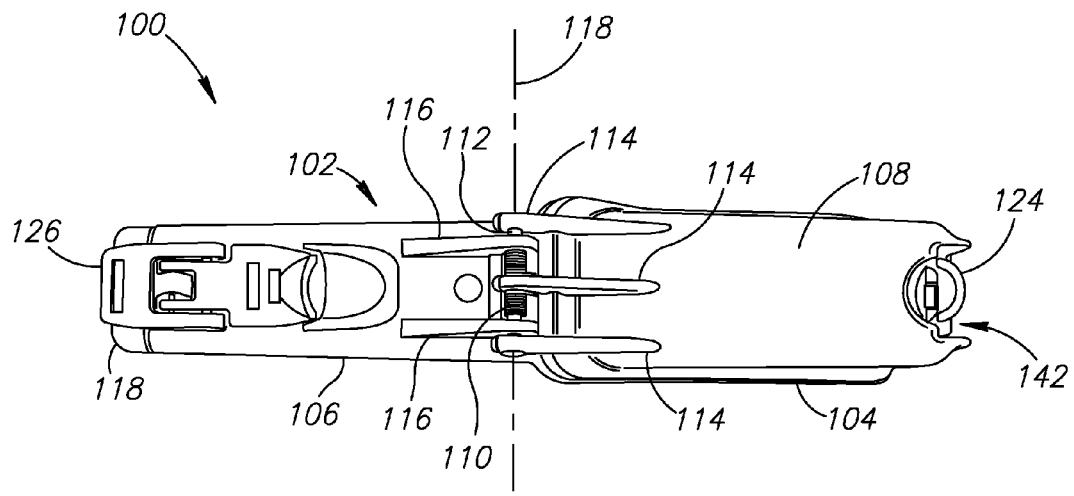
FIG. 1 is a top plan view of a carrier for a digital pen according to an embodiment of the present invention.
Figure 2:
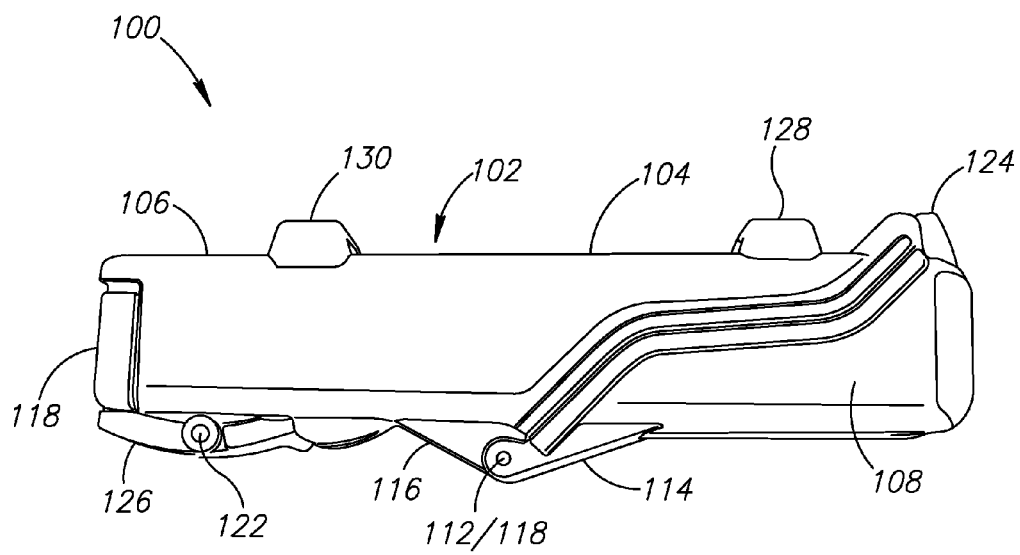
FIG. 2 is side elevational view of the carrier of FIG. 1.

FIGS. 1 and 2 show a carrier 100 for receiving a digital pen (not shown) having a main case 102, which includes an upper main case portion 104 and a lower main case portion 106 according to an illustrated embodiment of the invention. In addition, the carrier 100 includes an upper lid or cap 108 that may be opened and closed relative to the main case 102 to allow insertion and removal of the digital pen from the main case 102. The coupling (e.g., latching) of the lid 108 relative to the main case 102 is described in more detail below.

In one embodiment, the upper lid 108 is rotationally coupled to the main case 102 with a biasing member 110, which may take the form of a torsional spring. By way of example, the torsional spring 110 is positioned on a pivot axle 112 that extends through ribs 114, 116 of the upper lid 108 and main case 102, respectively. The pivot axle 112 is oriented along a common pivot axis 118. A spring constant of the torsional spring 110 may advantageously permit the upper lid 108 to be opened and closed relatively quietly.

A second cap or lid 118 is rotationally coupled to the lower main case portion 106 with a biasing member (not shown, but substantially similar to the biasing member 110 used for the upper lid 108) arranged on a pivot axle 122. One purpose of the lower lid 118 is to provide access to a serial port, such as a USB port, located within the lower main case portion 106. In the illustrated embodiment, both the first and lower lids 108, 118 may be latched to the main case 102 using dual-action latch mechanisms 124, 126, respectively representing the upper and lower latch mechanisms.

Optionally, upper and lower clip members 128, 130 may be coupled to the main case 102. The upper and lower clip members 128, 130 may be used to secure the carrier 100 to a jacket, uniform, belt, or some other attire. In addition, the clip members 128, 130 may also be used to tie down or otherwise secure the carrier 100 to other objects, for example a backpack, parachute harness, utility belt, vehicle, etc.

Figure 3:
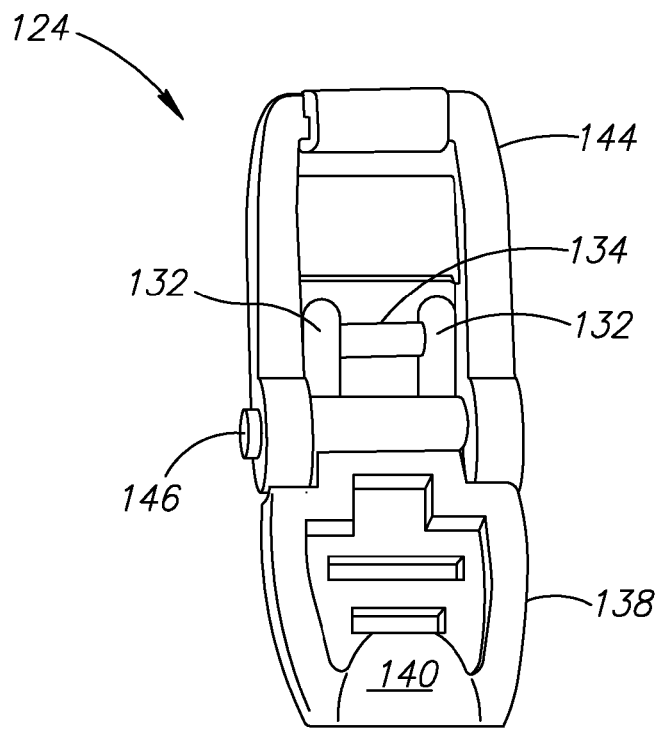
FIG. 3 is a bottom plan view of a dual-action latch according to an embodiment of the present invention.
Figure 4:
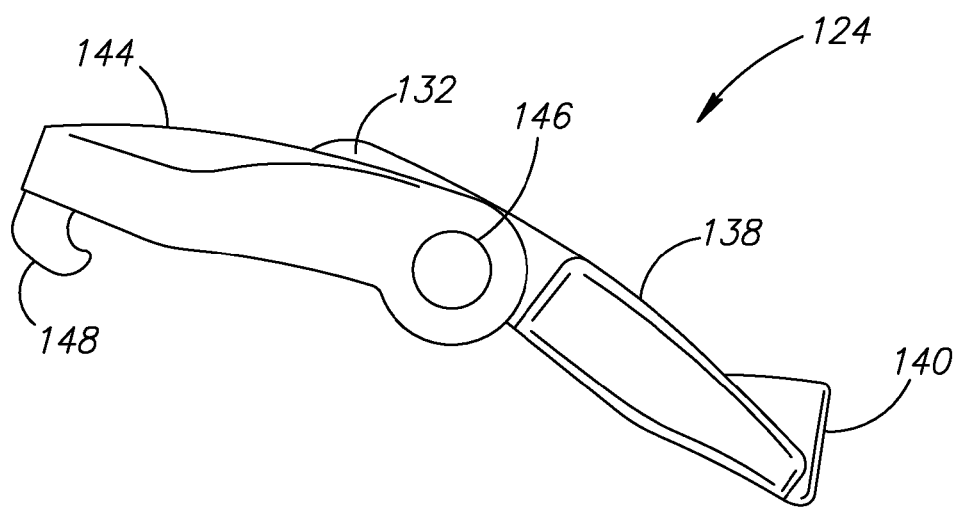
FIG. 4 is a side elevational view of the dual-action latch of FIG. 3.

FIGS. 3 and 4 shows the upper latch mechanisms 124 according to an illustrated embodiment of the invention. The lower latch mechanism 126 may be the same size or a different size from the upper latch mechanism 124, but otherwise is structurally and operationally identical and thus description of the upper latch mechanism 124 will sufficiently describe both latch mechanisms 124, 126.

The upper latch mechanism 124 includes a main case engagement lug 132 that is rotationally coupled with a first pivot axle 134 to a rib member 136 (FIG. 5) extending from the upper lid 108. A lifting portion 138 includes a contoured, recessed portion 140 sized to receive at least a portion of a finger or tool (not shown). When in the closed portion, the upper latch mechanism 124 may be sufficiently recessed within a pocket 142 (FIG. 1) formed in the main case 102. Locating the lifting portion 138 in the pocket 142 helps to insure that the latch mechanism 124 will not be opened accidentally, for example if it were to be snagged by a branch or some other object. The latch mechanism 124 further includes a latching portion 144 rotationally coupled to the lifting portion 138 with a second pivot axle 146. The latching portion 144 includes an engagement portion 148, which may take the form of a hook 148 configured to engage a lip 150 (FIG. 7) extending from the main case 102.

In operation, the latch mechanism 124 functions as a dual-action latch in that a finger or tool may be inserted into the recessed portion 140 to apply an amount of upward force on the lifting portion 138. The upward force should be sufficient to overcome an amount of residual tension induced between the hook 148 and the lug 132 coupled to the main case 102. Hence, in the fully closed position, the latch mechanism 124 is preferably configured to have at least some residual tension to maintain the latch mechanism 124 in the closed position under most situations.

Figure 5:
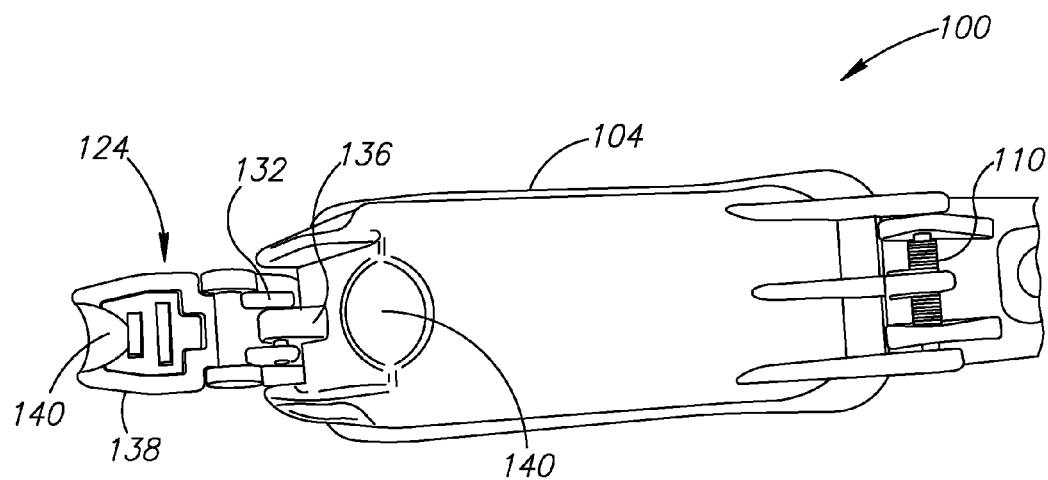
FIG. 5 is a side elevational view of the upper portion of the carrier of FIG. 1 with the dual-action latch of FIG. 3 oriented in a partially open position.
Figure 6:
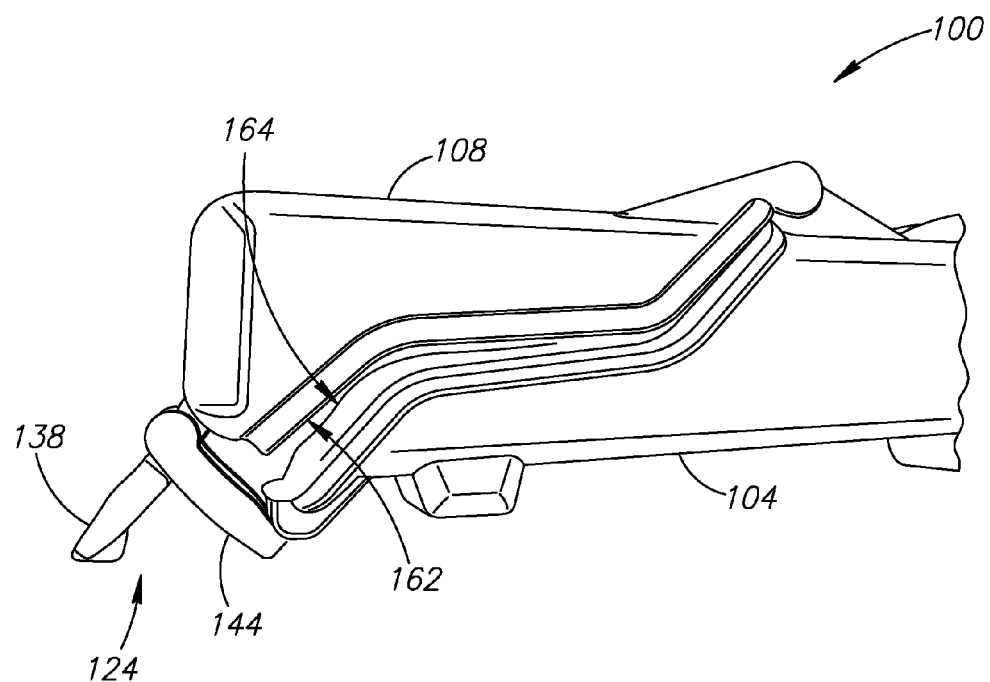
FIG. 6 is a side elevational view of the upper portion of the carrier of FIG. 1 with the dual-action latch of FIG. 3 oriented in a partially open position.
Figure 7:
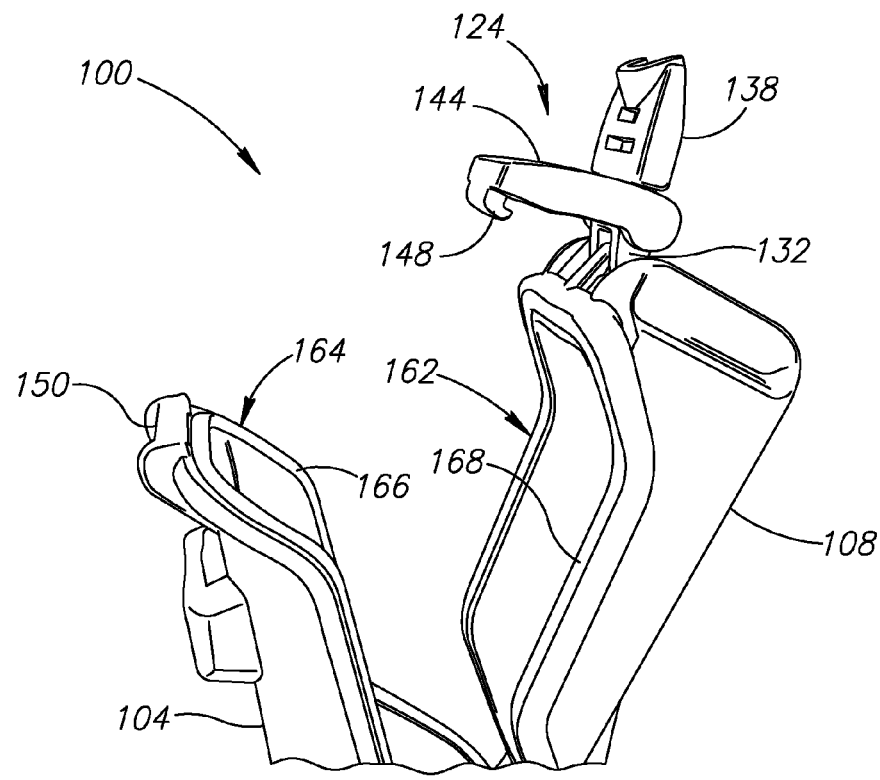
FIG. 7 is a perspective view of the upper portion of the carrier of FIG. 1 with the dual-action latch of FIG. 3 fully released from a main case of the carrier.

FIGS. 5-7 show the operation of the latch mechanism 124 and preferably shows the latch mechanism 124 in a partially open position (FIGS. 5 and 6) and in a fully open position (FIG. 7). In FIGS. 5 and 6, the lifting portion 138 has been raised, which releases the residual tension in the latch mechanism 124, while the hook 148 of the latching portion 144 remains engaged with the lip 150 main case 102. As best shown in FIG. 6, the latch mechanism 124 in the partially open position allows the upper lid 108 to slightly move away from the upper main case portion 104, but still maintains the upper lid 108 and the main case 102 in engagement via the hook 148 and lip 150 (FIG. 7). By applying slightly inward pressure on the upper lid 108 toward the main case 102 is sufficient to release the hook 148 from the lip 150. Once the upper lid 108 is released, the torsional spring 110 rotates the upper lid 108 away from the upper main case portion 104. As shown in FIG. 7, the hook 148 has been released from the lip 150 and the upper lid 108 is in the process of rotating away from the upper main case portion 104.

Figure 8:
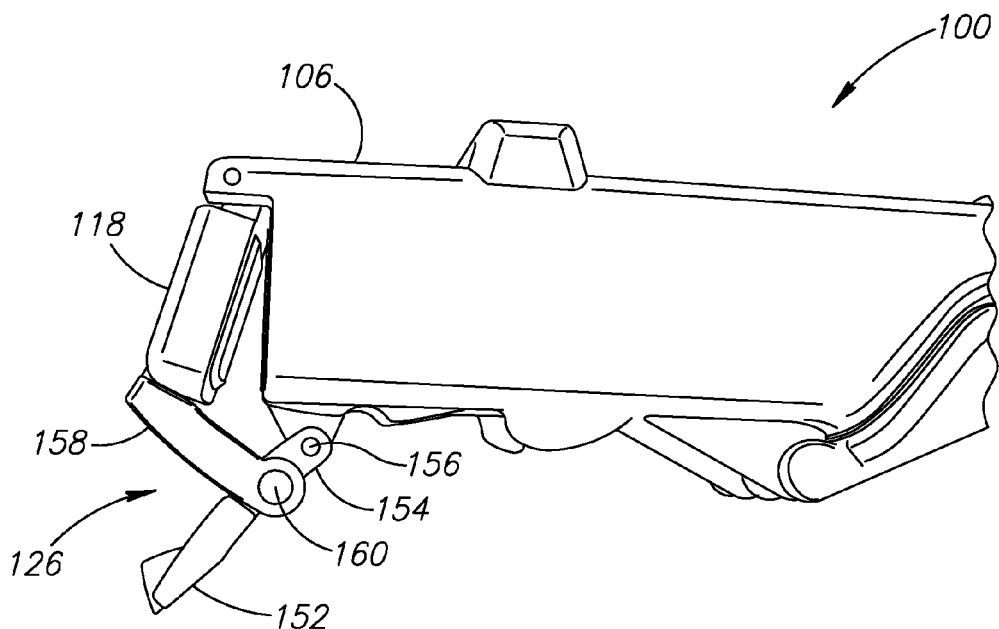
FIG. 8 is a side elevational view of the carrier of FIG. 1 showing a lower dual-action latch for latching a lower lid to a bottom portion of the carrier.

FIG. 8 shows the lower lid 118 being unlatched from the lower main case portion 106. As noted above, the configuration and operation of the lower latch mechanism 126 is substantially similar to the upper latch mechanism 124. For example, the lower latch mechanism 126 includes a lifting portion 152 rotationally coupled to the main case 102 with a lug 154 and a pivot axle 156. A latching portion 158 is rotationally coupled to the lifting portion 152 through pivot axle 160. An engagement member (not shown), which may take the form of a hook engages the lower lid 118. Slightly pressing (i.e., pushing the lower lid 118 toward the main case 102) on the lower lid 118 after the lifting portion 152 has been released completely releases the lower latch mechanism 126 from the lower lid 118 and permits the lower lid 118 to be fully opened.

Referring back to FIGS. 6 and 7, a contoured engagement surface 162 of the upper lid 108 is configured to engageably seal with respect to a complementary contoured engagement surface 164 of the upper main case portion 104. The contoured engagement surfaces 162, 164 cooperate with the upper latch mechanism 124 to provide a robust and durable engagement between the upper lid 108 and the upper main case portion 104. As best shown in FIG. 7, the contoured engagement surface 162 of the upper lid 108 may be recessed to receive a protruding portion 166 of the complementary contoured engagement surface 164. Alternatively, the complementary contoured engagement surface 164 may be recessed to receive a protruding portion (not shown) extending from the contoured engagement surface 162 of the upper lid 108. Further, a seal 168 may be located in the recessed portion of the contoured engagement surface 162 such that when the upper lid 108 is latched to the main case 104, the latching process compresses the seal 168 to provide a robust and durable seal between the upper lid 108 and the upper main case portion 104. And, the compression of the seal 168 further operates to induce the residual force in the upper latch mechanism 124, as described above. Although the contoured engagement surfaces 162, 162 may be oriented in a parallel and/or perpendicular orientation with respect to the main case body, it has been found that providing configuring of the surfaces 162, 164 in the illustrated non-parallel and non-perpendicular orientation may advantageously improve the sealing capacity between the upper lid 108 and the upper main case portion 104. By way of example, after the upper latch mechanism 124 has been fully latched, the surfaces 162, 164, the seal 168 and the upper latch mechanism 124 may cooperate to seal the carrier 100 in space up to about 40,000 feet and submerged down to about five meters below sea level.

Figure 9:
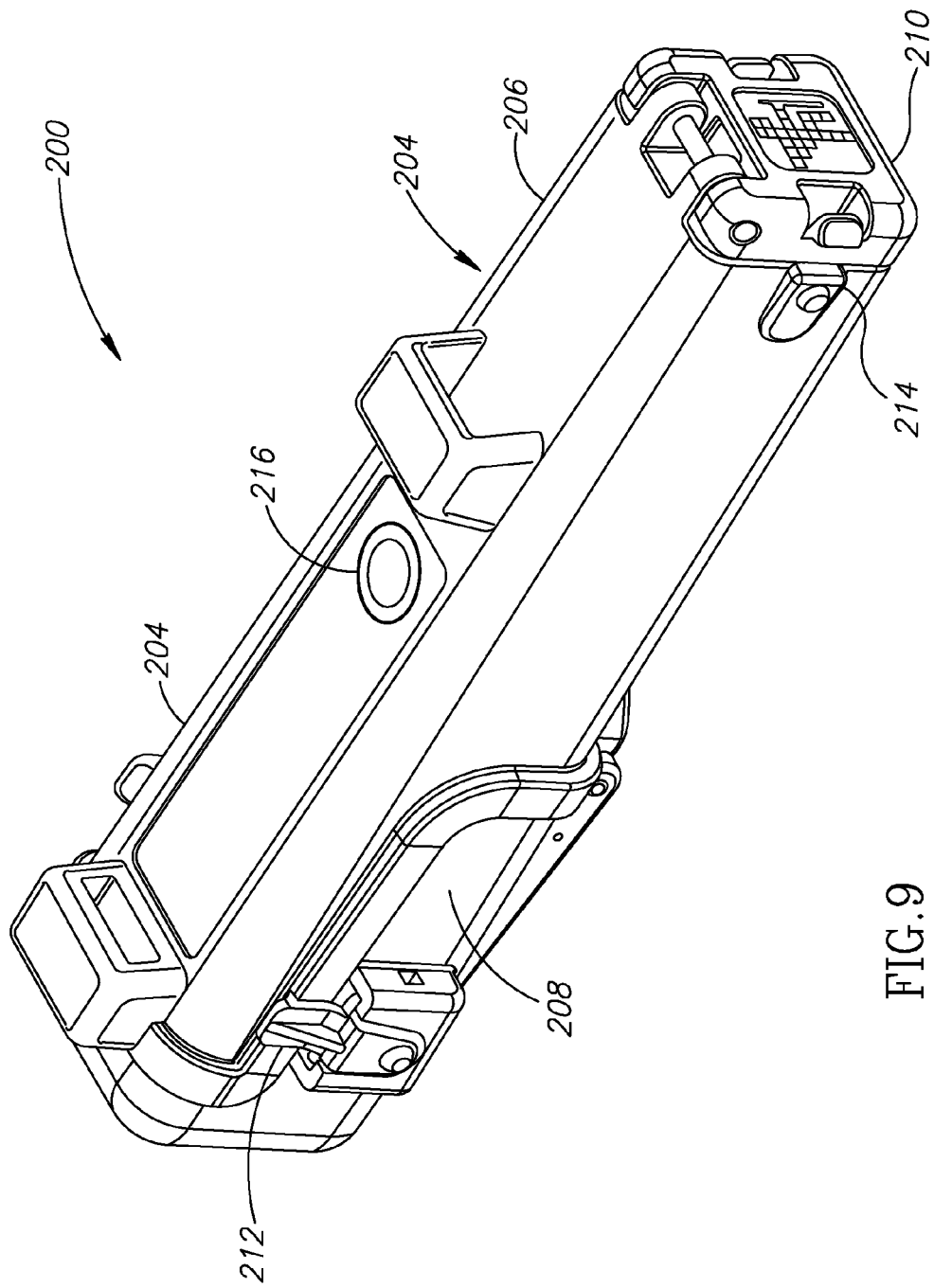
FIG. 9 a top, left isometric view of a carrier for a digital pen according to another embodiment of the present invention.

FIG. 9 shows a carrier 200 for receiving a digital pen (not shown) having a main case 202, which includes an upper main case portion 204 and a lower main case portion 206 according to another illustrated embodiment of the invention. In addition, the carrier 200 includes an upper lid or cap 208 that may be opened and closed relative to the main case 202 to allow insertion and removal of the digital pen from the main case 202. Likewise, the carrier 100 includes a lower lid or cap 210 that permits access to electrical and other components within the lower main case portion 206. In the illustrated embodiment and the figures that follow, similar features and aspects between the carrier 100 and the carrier 200 will not be described in detail.

The carrier 200 includes an upper latch mechanism 212 and a lower latch mechanism 214, which may take the form of single-action latch mechanisms. The upper latch mechanism 212 latches the upper lid 208 to the upper main case portion 204 and the lower latch mechanism 214 latches the lower lid 210 to the lower main case portion 206. The latch mechanism 212, 214 are cantilevered and hingedly attached with suitable engagement portions for latching. The carrier 200 further includes a pressure port 216, which may be coupled to a pressure sensor (not shown) for controlling a pressure within the carrier 200.

Figure 10:
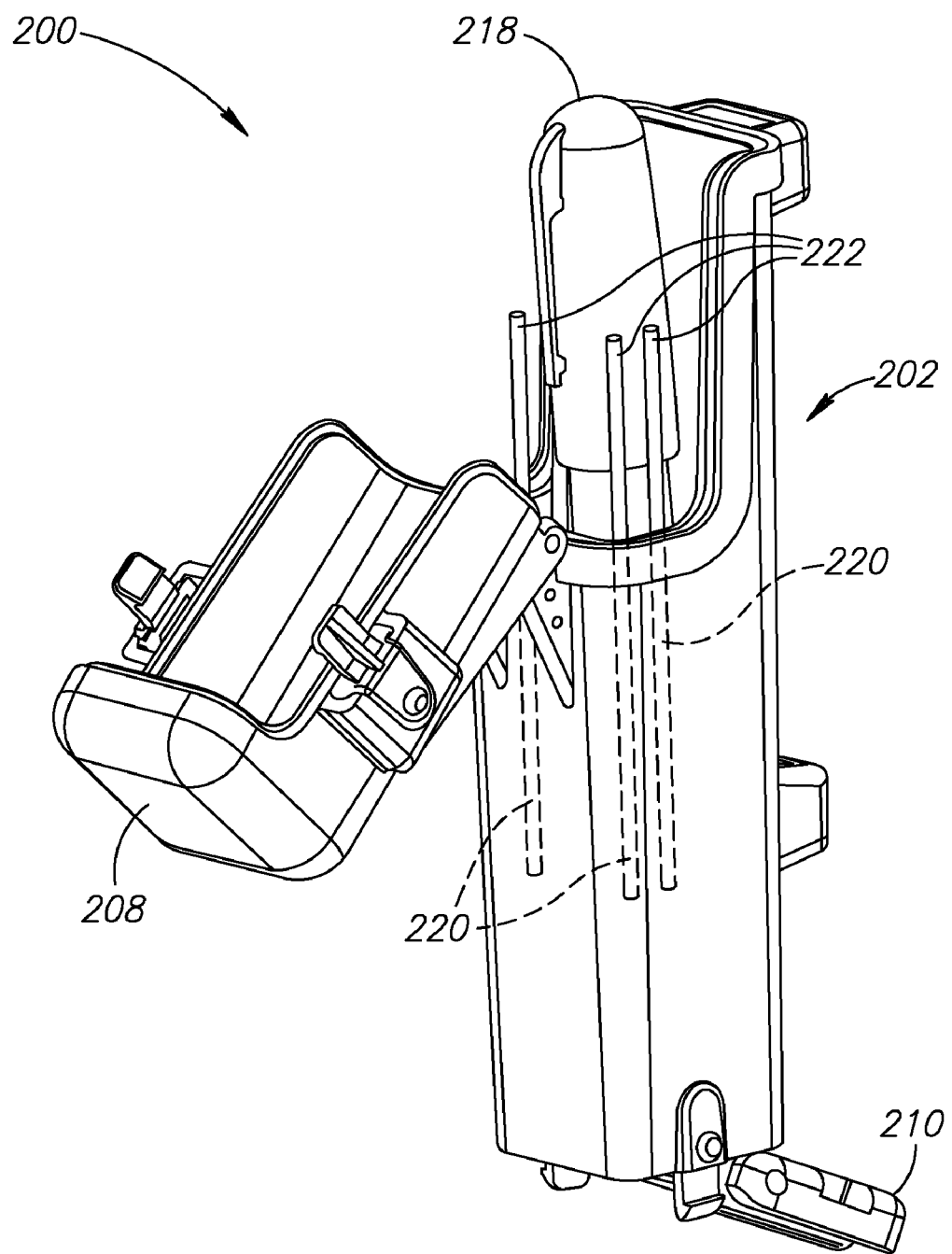
FIG. 10 is a perspective view of the carrier of FIG. 9 with receptacles to receive replaceable ink cartridges.

FIG. 10 shows the carrier 200 with the upper and lower lids 208, 210 in their fully open positions to display a digital pen 218 received by the main case 202. The digital pen 218 may be frictionally engaged and guided into the main case as will be explained in more detail below. The main case 102 may include receptacles 220 sized to receive replacement ink cartridges 222 for the digital pen. In the illustrated embodiment, the main case 102 includes four receptacles 220, but the number of receptacles may vary depending on a variety of reasons. The replacement ink cartridges 222 may take the form of different color ink cartridges, different writing tips, or even non-ink stylus devices.

Figure 11:
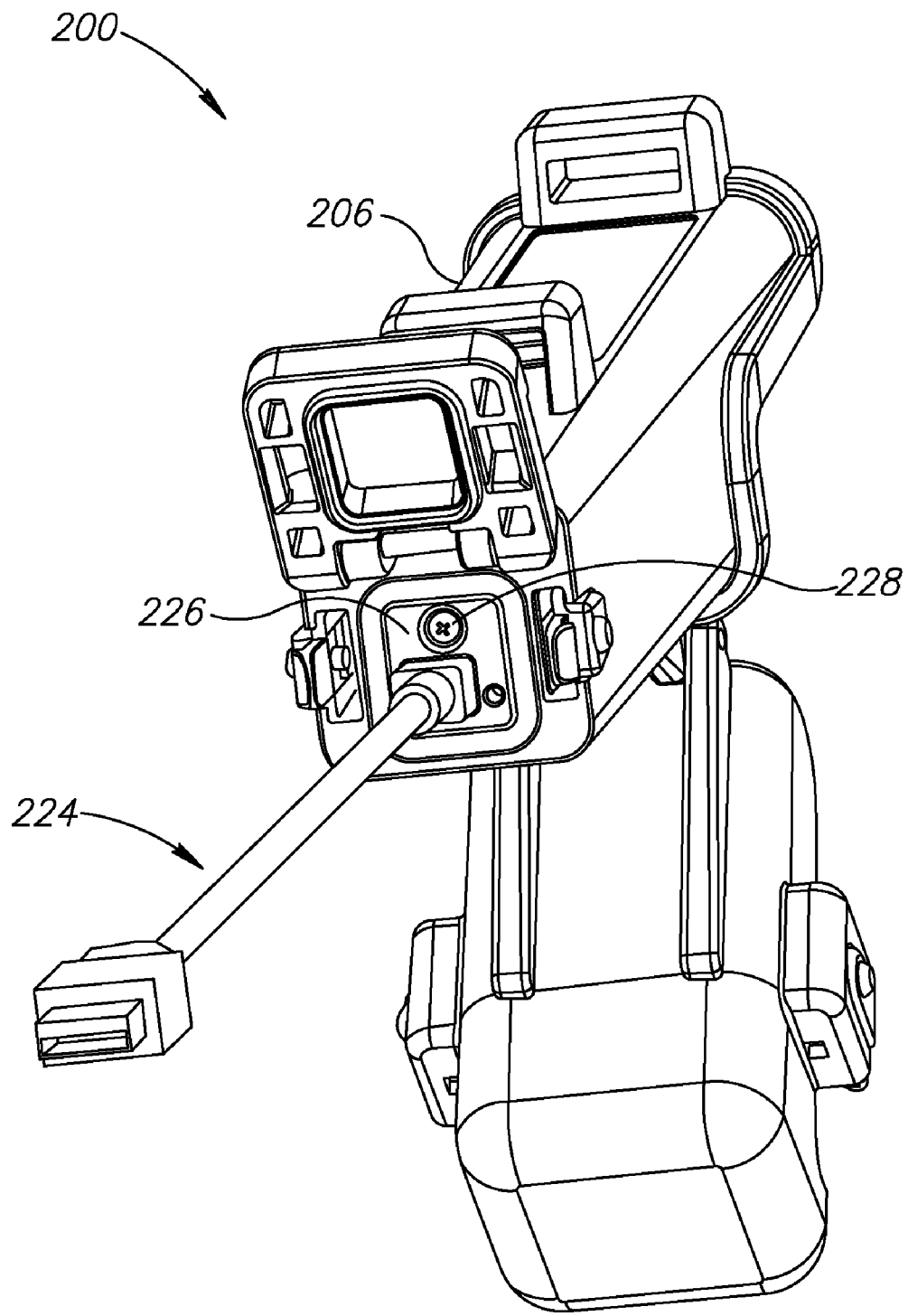
FIG. 11 is a perspective view of the carrier of FIG. 9 showing an extendable serial communications device extending from an electronic package located in the carrier.

FIG. 11 shows the carrier 200 having an extendable serial port 224 extending from an electronics package 226 located in the lower main case portion 206. The electronics package 226 may include circuitry to receive, transfer, and/or communicate raw or decoded camera data and other digital pen data. The electronics package 226 may further include a communications interface having protocol definitions for transferring data and for resetting and synchronizing the digital pen 218 (FIG. 10). In one embodiment, the electronics package 226 is removable and replaceable by removing a fastener 228. The serial port 224 may be configured to receive and transfer data from the digital pen 218 (FIG. 10) in excess of 450 kilobytes per second (kbps) and provide a bi-directional flow for master/slave control the digital pen 218 (FIG. 10). Further, the serial port 224 may operate as a charging device to provide power to and thus charge the digital pen 218 (FIG. 10). The electronics package 226 may further include a battery, such as, but not be limited alkaline or lithium batteries. By way of example, the electronics package 226 may include a microprocessor to control one or more light emitting diodes (LEDs) to indicate a charging status of the digital pen 218, provide illumination for writing and/or reading in darkened situations, provide signals indicating other operational functions of the digital pen 218 and carrier 200. The LEDs may be located on the lower lid 210. The microprocessor may be configured to run a variety of applications and perform a variety of control functions, such as, but not limited to running a RTOS expandable to a Tiny Linux or a Linux platform. In addition, the electronics package 226 may include a memory storage device.

For charging purposes, a temperature sensor 227 may be in signal communication with the microprocessor to determine whether the temperature within the carrier 200 is sufficient to permit charging of the digital pen 218. In one embodiment and for warranty purposes, the carrier 200 may include a temperature strip 229 to record a temperature of the electronic package 226 in the event of an abnormal temperature condition.

Figure 12:
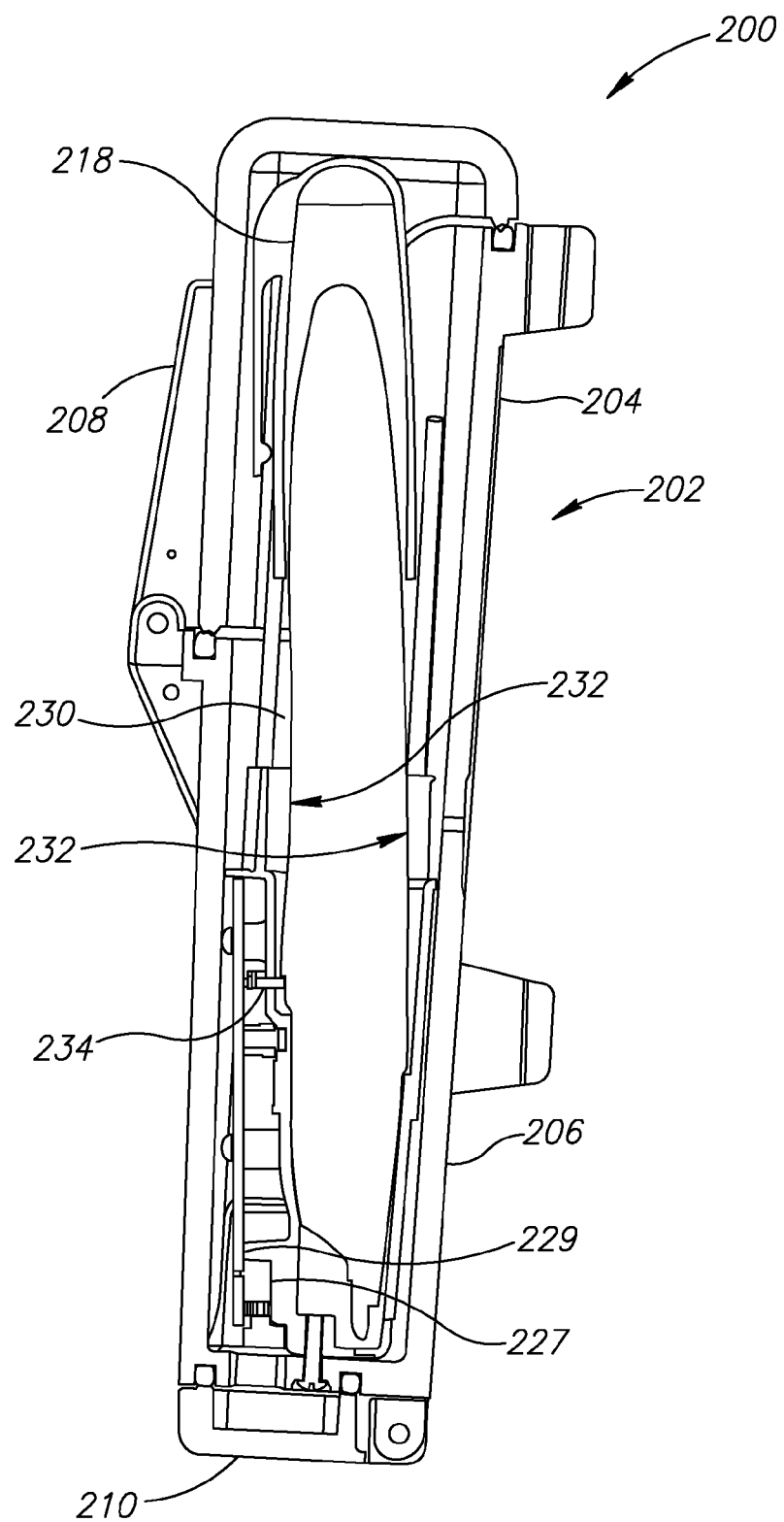
FIG. 12 is a cross-sectional view of the carrier of FIG. 9 showing contoured surfaces arranged to closely receive the digital pen.

FIG. 12 shows the digital pen 218 received in the main case 202 of the carrier 200 and the lids 208, 210 in their closed positions. The main case 202 includes an internal channel 230 for receiving the digital pen 218. In one embodiment, the internal channel 230 includes a surface 232 for self-aligning, frictionally engaging, and retaining the digital pen 218 with respect to the main case 202. By way of example, a contour and size of the surface 232 permits the digital pen 218 to be closely received into the main case 202. An amount of friction between the digital pen 218 and the surface 232 substantially retains the digital pen 218 within the main case 202, even when the upper lid 208 is open. Further, the surface 232 aligns the digital pen 218 such that it contacts electrical contact pins 234 within the main case 202. In one embodiment, the pins 234 take the form of pogo pins to provide a reliable and robust connection with a substantially long life cycle.

While the preferred embodiment of the invention has been illustrated and described, as noted above, many changes can be made without departing from the spirit and scope of the invention. For example, the features, aspects, and functions of the described embodiments may be combined to form additional embodiments. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A carrier for a digital pen comprising:
    a main case for receiving the digital pen, the main case having a main case lip;
    an upper lid rotationally and biasly coupled to the main case about a pivot axle, the upper lid having a contoured engagement surface configured to engage a complementary engagement surface of the main case; and
    a latch mechanism having a lifting portion rotationally coupled to a latching portion, the latch mechanism also having a hook, the latching portion rotationally coupled to the upper lid, the lifting portion operable to allow the upper lid to partially rotate away from the main case to form a gap while the hook of the latch mechanism remains engaged with the main case lip, the latching portion releasable from the first main case by partially closing the gap to allow the hook to disengage from the main case lip.

2. The carrier of claim 1, wherein the main case includes a lower body portion with an internal channel for receiving the digital pen.

3. The carrier of claim 2, wherein the internal channel is contoured to frictionally engage and substantially restrain the digital pen after insertion of the digital pen into the carrier.

4. The carrier of claim 3, wherein the contour of the internal channel is configured to closely and frictionally receive the digital pin and align the digital pen with the electrical contacts of an electronic package located within the main case.

5. The carrier of claim 1, wherein the upper lid is rotationally and biasly coupled to the main case with a torsional spring positioned on the pivot axle.

6. The carrier of claim 1, further comprising:
a lower lid located on a distal end of the main case relative to the upper lid.

7. The carrier of claim 1, further comprising:
an electronic package having a plurality of electrical contacts for engaging complementary electrical contacts on the digital pen, the electronic package located proximate the internal channel of the main case.

* * * * *